United States Patent
Chud

(10) Patent No.: US 10,616,281 B1
(45) Date of Patent: Apr. 7, 2020

(54) SERVICE-LEVEL AUTHORIZATION POLICY MANAGEMENT

(71) Applicant: Amazon Technologies, Inc., Seattle, WA (US)

(72) Inventor: Andrew Christopher Chud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 15/705,162

(22) Filed: Sep. 14, 2017

(51) Int. Cl.
*H04L 29/06* (2006.01)

(52) U.S. Cl.
CPC .......... *H04L 63/205* (2013.01); *H04L 63/105* (2013.01); *H04L 63/107* (2013.01)

(58) Field of Classification Search
CPC .... H04L 63/205; H04L 63/107; H04L 63/105
See application file for complete search history.

(56) References Cited

U.S. PATENT DOCUMENTS

| 9,087,189 | B1 | 7/2015 | Koeten et al. |
| 2004/0153407 | A1 | 8/2004 | Clubb et al. |
| 2014/0245373 | A1* | 8/2014 | Martin .................. G06F 21/604 726/1 |
| 2018/0300471 | A1* | 10/2018 | Jain ...................... H04L 63/105 |

* cited by examiner

*Primary Examiner* — Wasika Nipa
(74) *Attorney, Agent, or Firm* — Knobbe, Martens, Olson & Bear, LLP

(57) ABSTRACT

Systems and methods are described to facilitate generation of access policies for a network-accessible service. An authorization service may use access policies to control whether requests to access a network-accessible service are authorized. A user may submit to the authorization service a request to programmatically generate an access policy based on requests received at the network-accessible service during a training period, such that the access policy, if applied to the requests received during the training period, would result in an authorization result specified by the user. The authorization service may gather information regarding requests received during the training period, and thereafter programmatically generate an access policy based on parameter values, such as source identifiers, called functions, or authorization tokens, present within requests received during the training period.

21 Claims, 9 Drawing Sheets

SERVICE-LEVEL AUTHORIZATION POLICY MANAGEMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a computing system or multiple interconnected computing systems to provide computing resources to users of the data center. The data centers may be private data centers operated on behalf of an organization or public data centers operated on behalf, or for the benefit of, the general public.

Data centers may provide a number of network-accessible services, such as data storage services, data processing services, content delivery services, or any of a number of other services known in the art. In some instances, multiple services may be provided by a single entity (e.g., a single corporation). In other instances, different entities may provide services by use of a data center operated by another entity. For example, one entity may over computing resources on an on-demand basis to third parties, such that the third parties can utilize the resources to provide services via a communication network. The entity that makes a service available on a communication network can generally be referred to as a "service provider." For example, a service provider may be a corporation that makes a specific service, such as a web site, available on a network. A service provider may enable a variety of users to configure different instances of a service, such as different web sites on a web site hosting service or different data stores on a data storage service. Each configuration of a service (e.g., associated with a specific account) can be referred to as a "service instance." Each service instance may correspond to a user or entity which configured the service instance, which user can generally be referred to as a "service user." Each service instance can provide access to a respective service, as configured by the service user, to one or more clients. Clients may include, for example, the service user, other service instances (of the same service or different services), or other users (such as members of the general public).

Security and data privacy are often an important concern for network-accessible services. Various security mechanisms can be utilized to protect the integrity of services, such as firewalls or intrusion detection systems. One widely used mechanism is an access control policy. Such a policy can specify, for example, clients that are allowed access to a service instance, and the actions that the clients are allowed to perform (e.g., which data can be read from, written to, deleted, etc.). Access control polices can be drafted in a number of different formats, and can vary across services.

DETAILED DESCRIPTION

Figure 1:
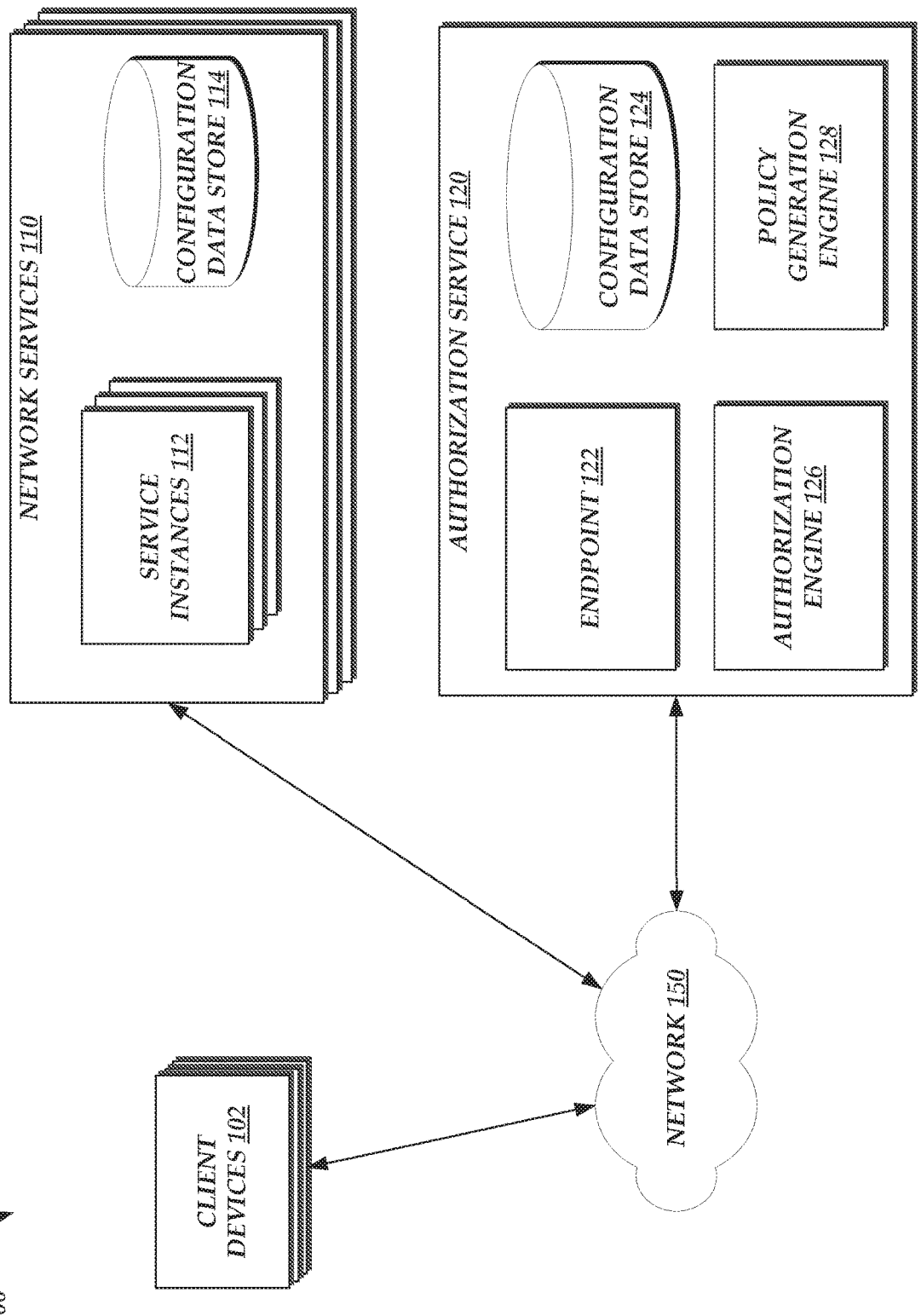
FIG. 1 is a block diagram of an illustrative network environment including client devices, network services, and an authorization service configure to review information regarding requests to access the network services and return authorization results indicating whether such requests should be allowed under access policies associated with the network services.

Generally described, the present disclosure relates to an authorization service, which manages access control policies of service instances corresponding to multiple network-accessible services. The authorization service may operate on behalf of the network-accessible services, and enable service users to generate and submit to the authorization service access policies for their respective service instances. The access policies may vary per-service instance, such that a service user is enabled to specify clients that may access the service instance. The access policies may conform to a variety of different formats, each of which may be defined by a service provider of the respective service. When a service instance receives a request to access the instance, it may pass information regarding the request to the authorization service. The authorization service, in turn, may compare the information to the access policies for the service instance, and return to the service instance an indication of whether the request should be allowed or denied. Because the authorization service can provide authorization control to multiple service instances across multiple network-accessible services, it may also serve as a centralized interface through which service users can define access policies for respective service instances, log access requests to such service instances, or otherwise monitor security of such service instances with respect to access requests.

In accordance with embodiments of the present disclosure, the authorization service may provide a number of functionalities beneficial to service users. For example, because guidelines for access policies can be defined by a service provider, these guidelines may change over time (e.g., as a service provider makes modifications to a service). In some instances, a service user may be unaware of such changes, and allow an outdated access policy to remain in effect of a service instance, leading to a potential loss of access to a service instance or reduction in security of the instance. In other instances, access policy guidelines may be updated to enable new functionalities, such as finer-grained specification of requests that should be encompassed within a policy. Thus, by not modifying a policy to take advantage of these new functionalities, a service user may lose advantages of those functionalities. Thus, as described below, an authorization service in some embodiments of the present disclosure can be configured to monitor alterations to access policy guidelines by service providers, and to notify service users when outdated access policies remain in effect and are expected to lead to losses in access or a reduction in security. In some instances, the authorization service can further assist a service user in modifying the access policy to conform to an updated access policy guidelines. For example, the authorization service may notify a service user a non-compliant access policy, notify the service user of particular aspects of the access policy that render the policy non-compliant with updated access policy guidelines, and further provide suggested modifications to cause the access policy to become compliant with the updated guidelines. As used herein, the term "non-compliant" can encompass, with respect to an access policy, any access policy that does not comply with any portion of a set of access policy guidelines, including requirements or best practices set forth in the guidelines. As such, a non-compliant access policy may refer to an access policy that includes an element disallowed under, deprecated by, or discouraged under access policy guidelines.

As another example of beneficial functionalities of an authorization service as disclosed herein, such an authorization service may enable service users to generate "shadow policies," enabling testing of access policies before such policies are put into force on the authorization service. Specifically, an authorization service may enable a user to define an access policy, and then specify a "shadowing period" for the policy. During such time, the authorization service may continue to use an existing policy to determine whether requests to access a service instance are allowed or denied. In addition, the authorization service may also compare information for a request to the shadow policy, to determine whether the request would be allowed or denied under the shadow policy (were that policy to be applied). The authorization service may further compare results of applying both the current in-force policy and the shadow policy to a request, and if those results differ, log such difference along with information regarding the request. Thus, after the shadowing period expires, a service user may be presented with a record of any requests received during the shadowing period for which an authorization result would differ between a current in-force policy and a shadow policy. By examining such a record, the service user is enabled to verify that any changes in system behavior with respect to authorization between the current in-force policy and the shadow policy are intended.

As yet another example of beneficial functionalities of an authorization service as disclosed herein, such an authorization service may enable service users to request programmatic generation of access policies, based on requests received during one or more training periods. Specifically, rather than directly authoring an access policy, a service user may designate a training period (e.g., a time period or a number of requests) as well as a desired authorization result (e.g., allow or deny), and then transmit or cause to be transmitted to a service instance a number of requests for which the service user desires the designated authorization result. The authorization service can then programmatically generate an access policy for the service instance, conforming to a policy format of the underlying service, that results in the desired authorization results for future requests that are similar to those received during the training period. In some instances, multiple training periods may be implemented. For example, a first training period may be used to transmit requests which should be allowed under a generated access policy, and a second training period may be used to transmit requests which should be denied under the access policy. Mechanisms for generating access policies based on requests received during one or more training periods are described in more detail below.

As will be appreciated by one of skill in the art in light of the present disclosure, the embodiments disclosed herein improves the security and functionality of computing systems that utilize access policies. Specifically, the embodiments disclosed herein allow computer performance of functions not previously performable by a computer, such as the detection of outdated access policies (e.g., conforming to an outdated service-level access policy format) expected to result in a loss of access to or security of a service instance, the implementation of shadow polices that enable testing of access policies in a controlled environment without effecting operation of a currently in-force policy, and the programmatic generation of access policies based on requests received during one or more training periods. Moreover, embodiments of the present disclosure improve the ability of computing systems to maintain security and data privacy within service instances by providing more accurate, up-to-date access policies for service instances. The presently disclosed embodiments therefore address technical problems inherent within computing systems; specifically, the difficulty in generating and maintaining accurate access policies for network-accessible services, to prevent unauthorized access to such services while maintaining availability of such services to authorized clients. These technical problems are addressed by the various technical solutions described herein, including the implementation of an authorization service that enables detection of outdated or non-compliant access policies, implementation of shadow policies to verify the effectiveness of an access policy prior to implementation, and programmatic generation of access policies based on requests received during one or more training periods. Thus, the present disclosure represents an improvement on existing network systems and computing systems in general.

With reference to FIG. 1, a block diagram showing a simplified logical environment 100 will be described in which an authorization service 120, network services 110, and client devices 102 may interact via a network 150.

Network 150 may be any wired network, wireless network, or combination thereof. In some instances, network 150 may be a telecommunications network, such as a personal area network, local area network, wide area network, cable network, satellite network, cellular telephone network, or combination thereof operating via the internet protocol (IP). In other instances, the network 150 may be or may include other network types, such as television networks or radio networks. In the example environment of FIG. 1, network 150 is a global area network (GAN), such as the Internet. Protocols and components for communicating via the other aforementioned types of networks are well known to those skilled in the art of electronic communications and thus, need not be described in more detail herein. While each of the client devices 102, the network services 110, and the authorization service 120, are depicted as having a single connection to the network 150, individual elements of the client devices 102, network services 110, and authorization service 120 may be connected to the network 150 at disparate points. Accordingly, communication times and capabilities may vary between the components of FIG. 1. While shown in FIG. 1 as a single network, the network 150 may represent different networks interconnecting the different components of FIG. 1. For example, the network 150 may represent a first network (e.g., the Internet) that interconnects the client devices 102 to a second, private network (not shown in FIG. 1) shared between the network services 110 and authorization service 120.

Client devices 102 may include any number of different devices configured to interact with the network services 110 or other elements of FIG. 1, such as the authorization service 120. For example, individual client devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. Each client devices 102 may include hardware and/or software enabling communication via the network 150. Client devices 102 may be used by service users to configure service instances 112 implemented by the network services 110, via interaction with the network services 110, authorization service 120, or both. Client devices 102 may further be used by end users to access such service instances 112. While shown as distinct, client devices 102 in some instances may be devices under control of or forming an element of a network service 110. For example, a first network service 110 may interact with a second network service 110 as a client of such second network service 110. In some instances, multiple network services 110 may interact with one another to provide conglomerate, aggregate, or interrelated services 110.

Each network service 110 includes one or more computing devices providing service instances 112 of the service 110. For example, a network service 110 may correspond to a web site hosting service, data storage service, on-demand code execution system (sometimes referred to as a "serverless" code execution system), or any number of network-accessible services. Each service instance 112 represents an instance of the service 110 with respect to an individual service user. For example, where the service 110 is a data storage service, a service instance 112 may be a collection of data stored on behalf of a service user. Where the service 110 is a web site hosting service, a service instance 112 may be a web site of a service user. Where the service 110 is an on-demand code execution system, a service instance 112 may represent an interface through which code of a service user can be executed on the service 110. Thus, each service instance 112 can represent a logical view of the service 110 with respect to a service user. As used herein, the term "service instance" can refer to any such logical view, including (by way of non-limiting example), a resource space of a service 110 that is specific to a given service user. Thus, use of the term "service instance" is not intended to imply that a separate implementation or execution of a given service 110 need occur for each instance. The service user may correspond to any entity interacting with a service 110 to establish a service instance 112, which entities may include individual users, collections of users, corporations, organizations, or the like. Each service instance 112 may be addressable via the network 150 in order to access the respective service instance 112. For example, each service instance may be associated with a unique network address, such as internet protocol (IP) address, or with a unique network identifier, such as a uniform resource identifier (URI). Thus, client devices 102 may transmit information to an address of a service instance 112 in order to access a logical view of a service 110 represented by the service instance 112. Services 110 may store information representing the service instances 112 (e.g., account information designating service instances 112, data provided by service instances 112, etc.) within a configuration data store 112. The configuration data store 112 can correspond to any persistent or substantially persistent data storage, such as a hard drive (HDD), a solid state drive (SDD), network attached storage (NAS), a tape drive, or any combination thereof.

To ensure the security and data privacy of service instances 112 (which may in some situations store confidential, private, sensitive, or otherwise restricted information), the network services 110 may enable service instances 112 to utilize an authorization service 120. Generally described, the authorization service 120 may represent a computing system (e.g., of one or more computing devices) configured to store access policies corresponding to individual service instances 112, to review information regarding requests to access service instances 112, and to provide an indication of whether such requests should be allowed or denied under the respective access policies of the service instances 112. An access policy may be generated by service users (e.g., utilizing a client device 102) and designate criteria for allowing or denying access to an individual service instance 112. Access policies are discussed in more detail with respect to FIG. 3, below.

The formatting of access polices for service instances 112 may be defined by a service 110 corresponding the service instance 112. For example, a web hosting service 110 may define a first format for access policies of instances 112 of the web hosting service 110, and a data storage service 110 may define a second format for access policies of instances 112 of the data storage service 110. Each format may vary in the criteria allowed within access polices of the service 110, or the manner in which such criteria must be satisfied. For example, a first format may allow for the use of regular expressions, while a second format does not. A third format may allow for limited use of wildcards or pattern matching (e.g., asterisk's to designate any value) but not for full regular expressions. As another example, a first format by require only a single set of criteria and request (e.g., allow or deny) to be included within an access policy, while a second policy allows for multiple criteria and results to be included within an access policy. As yet another example, a first format may require designation of criteria using a first statement block format (e.g., defining statements using curly-braces), while a second format may require designation of criteria using a second statement block (e.g., defining statements using meaningful white space). Additionally or alternatively to variations in formatting, the content of access policies may also vary. For example, functions callable on a first service 110 may be different than functions callable on a second service 110. Thus, a service 110 may require that each access policy of the service 110 be drafted to comply with guidelines of the service 110.

To enable interaction with the authorization service 120, the service 120 can include an endpoint 112. The endpoint 112 may include a web site, application programming interface (API), command line interface (CLI), other interfaces, or combination thereof through which client devices 102 and network services 110 can interact with the authorization service 120. For example, a client device 102 under control of a service user may interact with the endpoint 112 to specify an access policy for a service instance 112 corresponding to the service user. The endpoint 112 may cause the access policy to be stored within the configuration data store 124 of the authorization service 120. The configuration data store 124 can correspond to any persistent or substantially persistent data storage, such as a hard drive (HDD), a solid state drive (SDD), network attached storage (NAS), a tape drive, or any combination thereof.

Thereafter, a service instance 112 may utilize the endpoint 122 to determine whether individual requests to access the service instance 112 are authorized under the user-defined access policy. Specifically, on receiving a request to access the service instance 112, the service instance 112 may transmit information regarding the request (e.g., a function called, a network object or resource accessed, a source of the request, etc.) to the endpoint 112. The endpoint 112 can pass the information to an authentication engine 126, which is configured to compare the information regarding the request to criteria specified in the user-defined access policy, to determine whether the request is authorized. The authorization engine 126 (e.g., independently or by use of the endpoint 112) can then return a result of this determination to the service instance 112, such that the service instance 112 can allow or deny the request in accordance with the access policy.

In some cases, the access policy guidelines of a service 110 may change over time. For example, a service 110 may initially support only specification of particular information, such as a specific network address, within an access policy. Later, a service 110 may enable support for wildcard or pattern matching information, such as the use of regular expressions. Similarly, a service 110 may initially support a first function call (e.g., a "put" function) for a given functionality, and later transition to a second function call (e.g., a "post" function) for that or a similar functionality. Such changes may cause unexpected or undesirable functionality at service instances 112 of the service 110. For example, a service 110 may cease supporting a prior access policy format, which may cause access policies under the prior format to be ignored by the authorization service 112. Such changes could cause legitimate requests to access a service instance 112 to be denied, or cause illegitimate requests to access the instance 112 to be allowed (e.g., depending on other access policies or a default configuration of a service instance 112). Thus, such changes could reduce access to or security of service instances 112.

To address problems resulting from changes in access policy guidelines, the authorization service 120 disclosed herein can be configured to detect changes to access policy guidelines for a service 110, and to notify service users of access policies that are out-of-date or non-compliant with new access policy guidelines. Specifically, on receiving an indication from a service 110 that access policy guidelines of a service 110 are changing (e.g., to a new version of access policy guidelines), the authorization service 120 (e.g., via the engine 126) may compare existing access policies for the service 110 to the updated access policy guidelines, to determine whether such policies are compliant with the updated guidelines. When a policy is detected that is non-compliant with the new guidelines, the authorization service 110 may notify a service user corresponding to the non-compliant access policy, such that the service user may update the access policy to ensure compliance. In some instances, the authorization service 120 may further assist a service user in modifying a policy to ensure compliance with updated access policy guidelines. For example, a service 110 may notify the authorization service 120 of a transformation required to modify access policies under prior access policy guidelines to comply with updated access policy guidelines, and the authorization service 120 may determine which such transformations would apply to an access policy of a given service user, and prompt the service user to make such transformations within the access policy. As an illustrative example, where access policy guidelines previously required a first syntax (e.g., use of curly-braces), but now require a second syntax (e.g., meaningful white space), the authorization service 120 may provide a visual representation of an access policy to a service user, highlighting non-compliant elements (e.g., curly-braces) and suggesting the inclusion of now-required elements (e.g., meaningful white space). As another illustrative example, where access policy guidelines previously allowed a first function call (e.g., a "put" function) but now disallow that first function call in favor of a second function fall (e.g., a "post" function), the authorization service 120 may prompt a service user to replace instances of the first function call with instances of the second function call, and may further notify the service user of any changes in functionality of the respective functions (e.g., to ensure predictable behavior of the access policy). While compliance with access policy rules is in some instances discussed herein, the authorization service 120 may further notify service users of undesirable or discouraged content within an access policy. For example, the authorization service 120 may notify a service user that an access policy includes a function deprecated by a service 110, even if access policy guidelines still allow for such a function to be specified within an access policy for an instance 112 of the service 110. Thus, service users can be notified of changes to access policy guidelines of services 110 associated with the authorization service 120, to ensure accessibility, security, and data privacy of service instances 112.

In some embodiments, the authorization service 120 may be configured to implement functionalities to assist service users in generating one or more access policies for a service instance 112. Specifically, in accordance with embodiments described herein, an authorization service 120 may enable service users to implement shadowed access policies (sometimes referred to as "shadow policies"), representing access policies to be compared to a currently in-force policy, prior to or without placing the shadow policy into force. As will be described in more detail below, shadow policies may enable service users to test access policies against actual requests transmitted to a service instance 112, to ensure that the shadow policy has a desired effect when applied by the authorization service. For example, a user may desire to test a new access policy prior to putting the policy into force, and request that the new policy "shadow" a currently in-force policy for a given period of time. During that time, the authorization service 120 may compare information regarding requests for a service instance 112 to both a currently in-force access policy and the shadow policy, and may generate a report indicating any requests for which a difference in authorization exists between the in-force policy and the shadow policy. By reviewing such a report, a service user may verify that the shadow policy is modifying a currently in-force policy in an intended manner (if any modification in fact exists).

Furthermore, in some embodiments, the authorization service 120 may include a policy generation engine 128 configured to generate access policies for a service instance 122 based on requests transmitted to a service instance 112 during a training period. As will be discussed in more detail below, a service user may interact with the authorization service 120 to designate a training period, during which the authorization service 120 will monitor any requests to a service instance 112. The service user may further specify a desired result for the training period (e.g., allow access, deny access, etc.). After expiration of the training period, the policy generation engine 128 may utilize access policy guidelines of the service 110 to which the service instance 112 corresponds to generate an access policy for the service 112. Specifically, the policy generation engine 128 may examine information regarding each request, and programmatically generate an access policy that would, if implemented, cause the desired result (as specified by the service user) with respect to the requests generated during the training period. As discussed in more detail below, the policy generation engine 128 may further generate the access policy such that the desired result would be caused by requests similar to those received during the training period. Various mechanisms for determining such similar results are discussed in more detail below.

Thus, in accordance with embodiments of the present disclosure, the authorization service 120 as described herein can enable intuitive, accurate generation of access policies for service instances 112, thus increasing the security and data privacy of such service instances 112.

Figure 2:
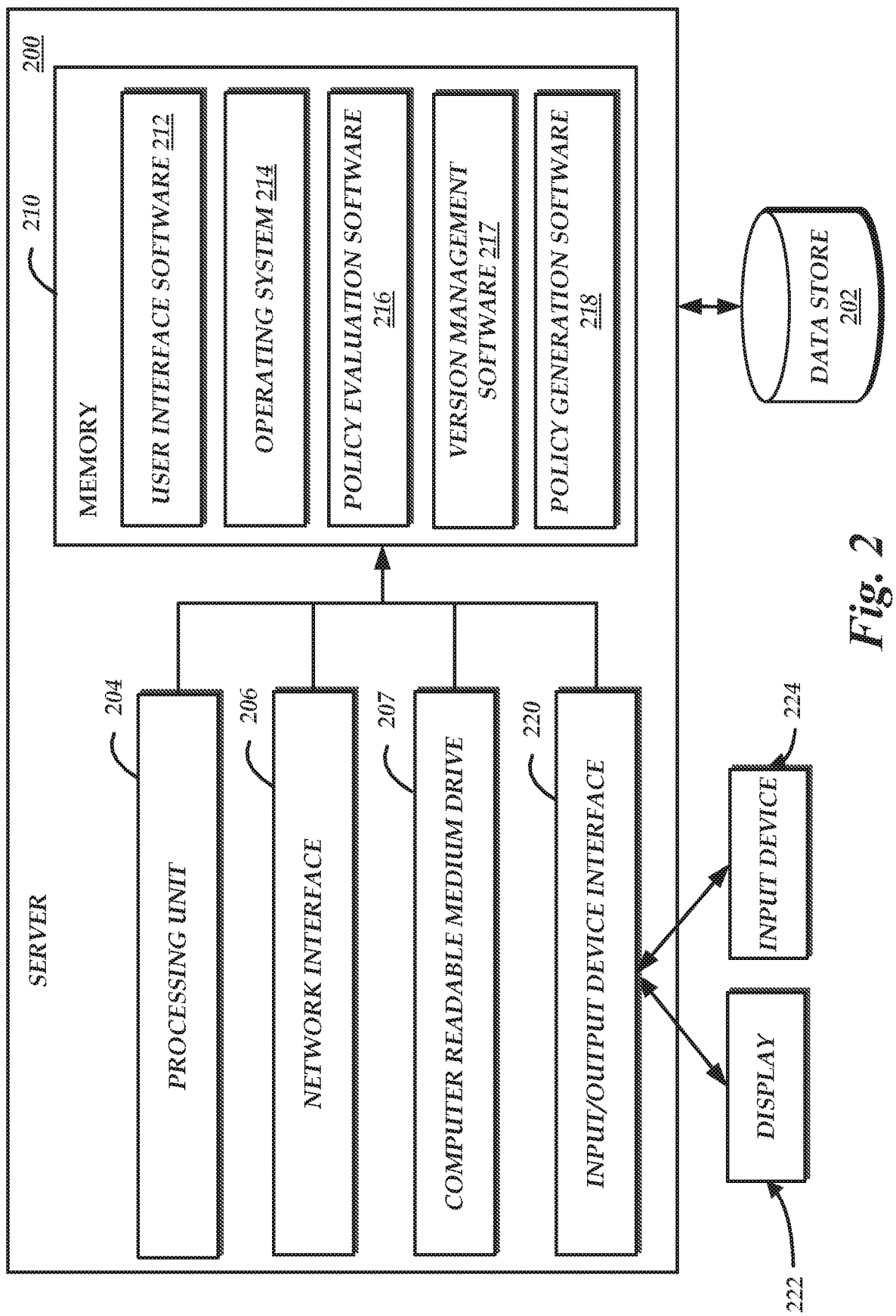
FIG. 2 is a block diagram depicting an illustrative configuration of one embodiment of a server than may provide an authorization service of FIG. 1.

FIG. 2 depicts one embodiment of an architecture of a server 200 that may implement the authorization service 120 or other components described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 222, and an input device 224, all of which may communicate with one another by way of a communication bus. The network interface 206 may provide connectivity to one or more networks or computing systems, such as the network 150 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes random access memory (RAM), read only memory (ROM) and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. These user interfaces may provide input, for example, to the endpoint 122 of FIG. 1, and may enable client devices 102 to specify and submit access policies for service instances 112 or to implement other functionalities of the authorization service 120 (e.g., the implementation of shadow policies or the programmatic generation of an access policy based on requests received during a training period). In addition, memory 210 may include or communicate with one or more auxiliary data stores, such as data store 202, which may correspond to any persistent or substantially persistent data storage, such as a hard drive (HDD), a solid state drive (SDD), network attached storage (NAS), a tape drive, or any combination thereof. Illustratively, the data store 202 may correspond to the configuration data store 124 of FIG. 1.

In addition to the operating system 214 and the user interface module 212, the memory 210 may include policy evaluation software 216, version management software 217, and policy generation software 218, each of which correspond to code executable by the server 200 to implement aspects of the present disclosure. For example, the policy evaluation software 216 may configure the server 200 to compare information regarding a request received at a service instance 112 to an access policy for the service instance 112, and to determine an authorization result for the request. The version management software 217 may configure the server 200 to detect a change in access policy guidelines for a service 110, to determine whether any access policies for instances 112 of the service 110 would include disallowed, deprecated, or discouraged content under such new access policy guidelines, to notify service users of such disallowed, deprecated, or discouraged content, and in some instances to suggest to service users modifications to ensure compliance or adopt a recommended format under the new access policy guidelines. The policy generation software 218 may configure the server 200 to generate an access policy for a service instance 112, based on requests received at the service instance 112 during a training period. Thus, code residing in memory 210 may be executed by the service 200 to implement aspects of the present disclosure.

Figure 3:
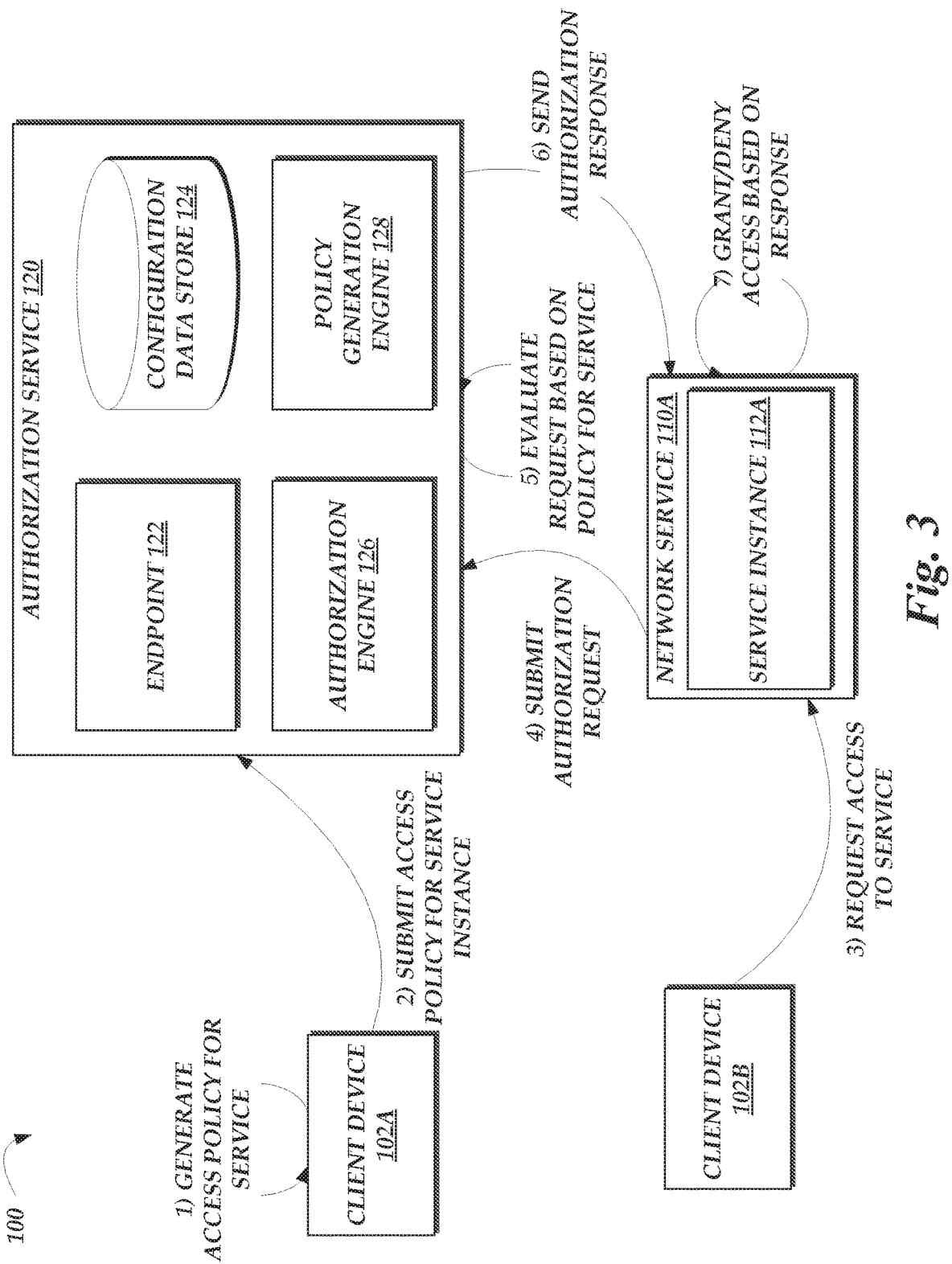
FIG. 3 is a block diagram depicting illustrative interactions to establish an access policy an authorization service of FIG. 1 for an instance of a network service, and to enforce the access policy with respect to a request to access the instance.

With reference to FIG. 3, a set of illustrative interactions will be described for implementation of an access policy for an individual service instance 112A on the authorization service 120. Specifically, the interactions of FIG. 3 enable a service user, utilizing a client device 102A, to author an access policy for a instance 112A of a service 110A corresponding to the service user, and to submit that access policy to the authorization service 120 to control access to the service instance 112A. For the purposes of FIG. 3, it will be assumed that the client device 102A (or other client device 102 under control of the service user) has previously configured the network service 110A to provide the service instance 112A. For example, the client device 102A may have previously signed up for an account on the network service 110A and been provided access information (e.g., a network address or URI, access credentials, etc.) of the service instance 112A, as well as access information for the authorization service 120.

The interactions of FIG. 3 begin at (1), where the client device 102A generates an access policy. As noted above, the access policy can include criteria for identifying one or more requests to the service instance 112A, as well as a desired result of requests matching such criteria. The criteria may include one or more actions or functions provided by a service instance 112. For example, where the service instance 112 is a data storage service, an access policy whether to allow or deny calls to a "get" function (to retrieve information), a "put" function (to store information), or a "delete" function (to delete information). Where a service instance 112 is an on-demand code execution system, an access policy may specify whether to allow or deny calls to execute various code segments associated with the service instance 112. For a given action, an access policy may further specify criteria to distinguish allowed accesses from denied accesses. For example, an access policy may specify that requests meeting a first set of criteria should be allowed, and all other requests should be denied. The first set of criteria may include, for example, one or more of information identifying potential sources of requests to access the service instance 112 (e.g., via a URI, network address, or other identifier of an accessing client device 102), information identifying potential destinations of requests on the service instance 112 (e.g., via a URI, network address, or other identifier of a resource of the service instance 112), information identifying authentication information (e.g., a username, password, authentication token, etc.) of a client device 102 requesting access to the service instance 112, timing information of a request to access the service instance 112 (e.g., designating time periods at a request is allowed, a frequency of requests over time, etc.), or contents of a request (e.g., parameters passed to a function call on the service instance 112). Additional or alternative criteria may also be used. In some instances, criteria may be designated specifically (e.g., as a particular network address from which requests are allowed). In other instances, criteria may include wildcard or pattern matching information designating a range or set of potential information satisfying the criteria. For example, criteria may be specified by use of regular expressions. In some cases, multiple sets of criteria may be specified. For example, a first set of criteria may be used to specify a first set of allowed access requests, a second set of criteria may be used to specify a second set of allowed access requests, etc. Sets of criteria may be ordered, such that a higher ordered set of criteria is enforced before and takes precedence over a lower ordered criteria. In one embodiment, each access policy contains a single set of criteria. In another embodiment, each access policy contains multiple sets of criteria. In some instances, multiple access policies may be specified for a given service instance 112, and the access policies may be ordered in a similar manner to criteria ordering as discussed above.

As noted above, access policy guidelines may vary among network services 110A. For the purposes of FIG. 3, it will be assumed that the service user of the client device 102A is aware of such access policy guidelines, and generates the access policy to conform to such guidelines. However, the authorization service 120 may include additional functionality to ensure such conformity. For example, the authorization service 120 may include functionality to parse a newly submitted access policy, and reject policies that do not conform to access policy guidelines for a given service 110.

At (2), the client device 102A submits to the authorization service 120 the access policy. Illustratively, the client device 102A may submit to the endpoint 122 the authored access policy, along with credentials of the service user. In one embodiment, the access policy may be included within a text-formatted file uploaded to the endpoint 122. In another embodiment, the access policy may be generated by the client device 102A via interaction with an interface of the authorization service 120 (e.g., a web browser interface), and the client device 102A may submit the access policy by submission of the policy through the interface. The authorization service 120 may store the submitted access policy in the configuration data store 124 for later use in determining whether requests to the service instance 112A are authorized.

Thereafter, at (3), a second client device 102B submits an access request to the service instance 112A, as implemented by the network service 110A. The client device 102B may be a device manually operated by a user (e.g., the service user or another user), or may be a device operating programmatically (e.g., a device under control of a network service 110A). The request may generally request access to the service instance 112A. For example, the request may include a call to a specific function on the service instance 112A, as well as parameters to pass to the function.

To ensure that the access request is authorized, the service instance 112A can be configured, at (4), to submit an authorization request to the authorization service 120, including information regarding the received request. In some embodiments, the information include a copy of the request, or any information specified within the request (e.g., a function called, parameters passed, authentication information included in the request, etc.). In some embodiments, the information may include metadata regarding a request, such as a time at which the request was received, a source of the request (e.g., as identifying information, such as a network address or URI of the client device 102B), or other information obtained by the network service 110A in conjunction with a request.

At (5), the authorization service 120 compares the received information to one or more access policies in force for the service instance 112A, to determine an authorization result. Specifically, the authorization service 120 applies the criteria of each access policy (e.g., in an order defined by a priority of the relative access policies), to determine whether the policy applies to the request. For example, the authorization service 120 may determine whether a source identifier of a request matches criteria for one or more identifiers within an access policy, whether authentication information (e.g., a username, password, authentication token, etc.) matches criteria for authentication information in the access policy, etc. If an access policy is found to match the request, the authorization service 120 determines a request result (e.g., allowance or denial) of the request pursuant to the policy. The result is then transmitted within an authorization response to the service instance 112A at (6). If no access policy is found matching the request, the authorization service 120 can send a default authorization response (e.g., denial of access) to the service instance 112A. At (7), the service instance 112A can grant or deny access to the service instance 112A in accordance with the authorization response. Illustratively, denial of access may result in a return to the client device 102B of an "access denied" response. Granting of access may result in execution of the function or action specified within the access request. Thus, via the interactions of FIG. 3, a service user is enabled to specify access policies that control access to instances 112 of network services 110.

As discussed above, access policy guidelines can vary among network services 110, and may generally be under control of an administrator of the network service 110 (e.g., as opposed to service users associated with individual instances 112 of the service 110). Thus, it is possible that an access policy drafted in accordance with access policy guidelines of a first set of access policy guidelines for a service 110 does not comply with or does not meet recommended standards for a second set of access policy guidelines for the service 110. For this reason, changes to access policy guidelines can in some cases result in errors or losses in security at service instances 112.

Figure 4:
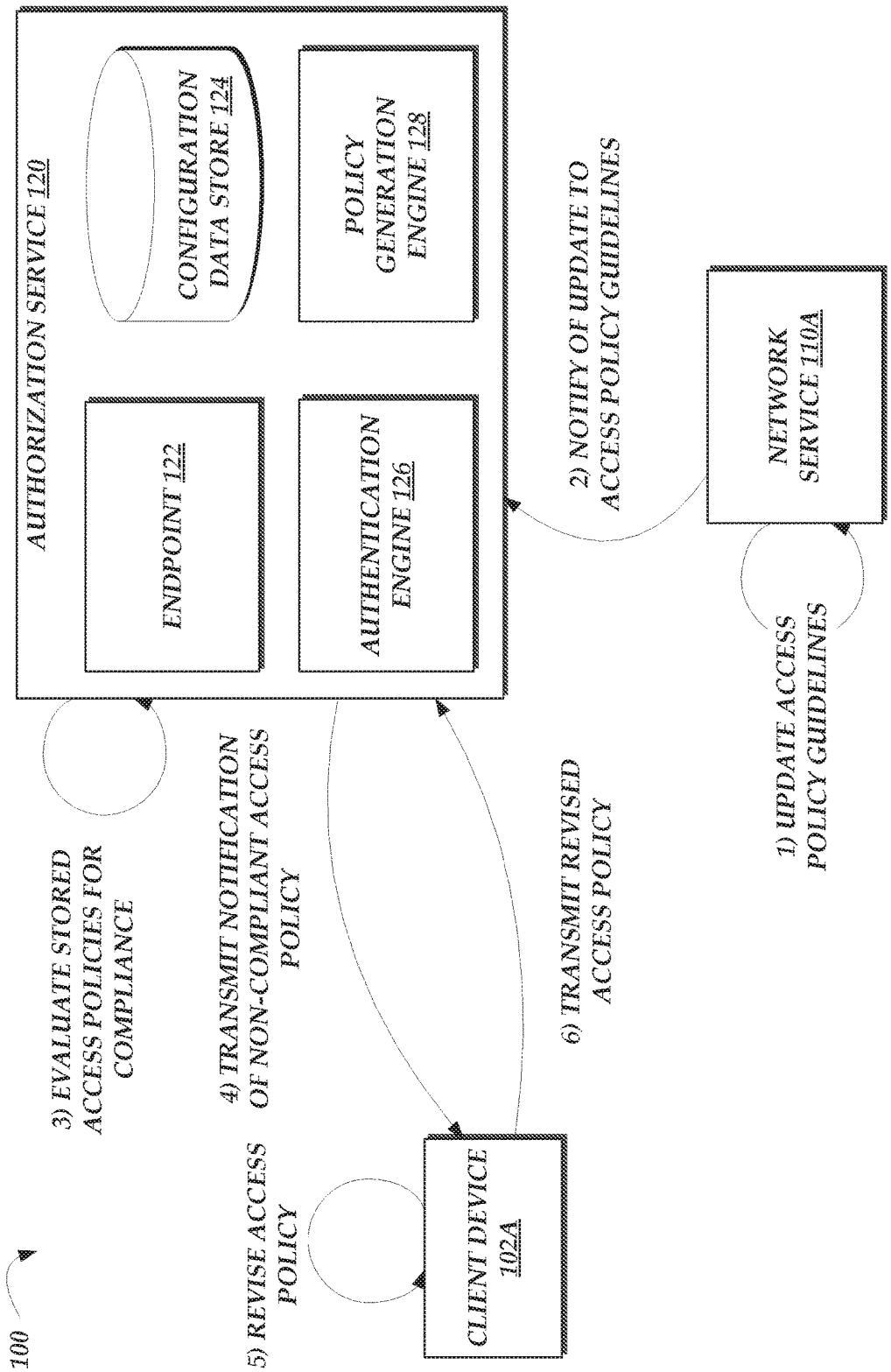
FIG. 4 is a block diagram depicting illustrative interactions to notify a service user that an access policy maintained at an authorization service of FIG. 1 for a service instance contains non-compliant or deprecated elements due to a modification of access policy guidelines at the service.

To address these problems, an authorization service 120 as disclosed herein may be enable to notify service users of current access policies that are non-compliant with a current set of access policy guidelines or use disallowed, deprecated, or discouraged elements under such guidelines. The authorization service 120 can further be enabled to notify the service user of potential modifications to an access policy to address such disallowed, deprecated, or discouraged elements. Illustrative interactions for notifying a service user of an access policy including disallowed, deprecated, or discouraged elements are shown in FIG. 4. For the purposes of description of FIG. 4, it will be assumed that a service user is associated with a client device 102A, and has previously submitted an access policy for a service instance 112 associated with network service 110A, which policy was at the time of submission compliant with current access policy guidelines of the network service 110A.

The interactions begin at (1), where the network service 110A updates access policy guidelines of the network service 110A. The updated policy guidelines may modify, for example, formatting requirements of an access policy or formatting requirements for criteria specified within the access policy. Illustratively, updated policy guidelines may discourage, deprecate or disallow a previously allowed function while allowing a previously disallowed function. As another illustration, updated policy guidelines may allow for different wildcard or pattern matching values than prior policy guidelines.

At (2), the network service 110A notifies the authorization service 120 of the update to the access policy guidelines. The notification may include, for example, rules specifying allowed values of various parameters within access policies for the network service 110A. In some instances, the notification may further include information on transforming discouraged, deprecated or disallowed elements into an allowed element. For example, the notification may include, for a discouraged, deprecated or disallowed function, a suggested allowed function with similar functionality. As another example, for a discouraged, deprecated or disallowed parameter value (e.g., a value including a first type of wildcard or pattern matching expression), the notification may include a suggestion to modify the value to conform to the updated access policy guidelines.

At (3), the authorization service 120 inspects currently in-force access policies for the network service 110, to identify access policies non-compliant with the updated access policy guidelines (or including elements discouraged, deprecated or disallowed by the updated access policy guidelines). For example, the authorization service 120 may compare the elements of each access policy for the network service 110A to rules provided by the network service 110A for assessing such access policy compliance, in order to identify non-compliant access policies.

For the purposes of description of FIG. 4, it will be assumed an access policy previously submitted by the service user associated with the client device 102A is non-compliant with the updated access policy guidelines. Thus, at (4), the authorization service 120 transmits to the client device 102A a notification of a non-compliant access policies. The notification may be transmitted via any communication mechanism, such as an interface of the authorization service 120, an electronic mail communication, a communication via other messaging protocol, etc. In some instances, the notification may include specific information on elements of a current access policy that is disallowed, deprecated or discouraged under updated access policy guidelines. For example, the notification may indicate specific criteria (e.g., actions, functions, parameter values, etc.) identified within an access policy that are disallowed, deprecated or discouraged under updated access policy guidelines. In some instances, the notification may further indicate suggested transformations of elements of the access policy to conform to the updated access policy guidelines, in accordance with the information provided by the network service 110A.

Thereafter, at (5), a service user of the client device 102A revises the access policy to conform to or otherwise be allowed under the access policy guidelines. For example, the service user may make modifications to the access policy in accordance with the suggested transformations provided within the notification. The client device 102A may then submit the revised access policy to the authorization service 120, in a similar manner to an initial submission of an access policy. The authorization service 120 may then store the revised access policy for later use in determining authorization of requests received at an instance 112 of the network service 110A associated with the service user.

In some instances, network services 110A may be configured to utilize versioning information for access policy guidelines, to better facilitate notifications to client devices 102A as to non-compliant or discouraged access policies. For example, each set of access policy guidelines for a network service 110 may be associated with an advancing version identifier (e.g., "1," "2," "3," etc.) for the service 110. The authorization service 120 may be configured to enable specification of access policies under a number of versions (e.g., the latest two versions), and an access policy may include a version identifier to cause the policy to be evaluated under access policy guidelines corresponding to the identified service version. In some such instances, the authorization service 120 may consider a version identifier within an access policy as an element that is potentially disallowed, deprecated or discouraged. For example, where an access policy specifies an identifier of a first version of access policy guidelines for a service 110, and the service 110 later updates its access policy guidelines to a second version, the authorization service 120 may notify a client device 120 that the service version identifier within the access policy is disallowed, deprecated or discouraged. Thus, client devices 102 (e.g., and service users using such devices 102) can be readily informed of the release of new versions of access policy guidelines for a network service 110.

In some cases, a version identifier for access policy guidelines may be defined independently from other version identifiers within an access policy. For example, the authorization service 120 may itself establish guidelines for access policies (e.g., formatting requirements) in addition to access policy guidelines established by a service 110. Thus, access policies may include a version identifier for authorization service 120 guidelines or requirements, in addition to or alternative of a version identifier for access policy guidelines as established by a network service 110.

Figure 5:
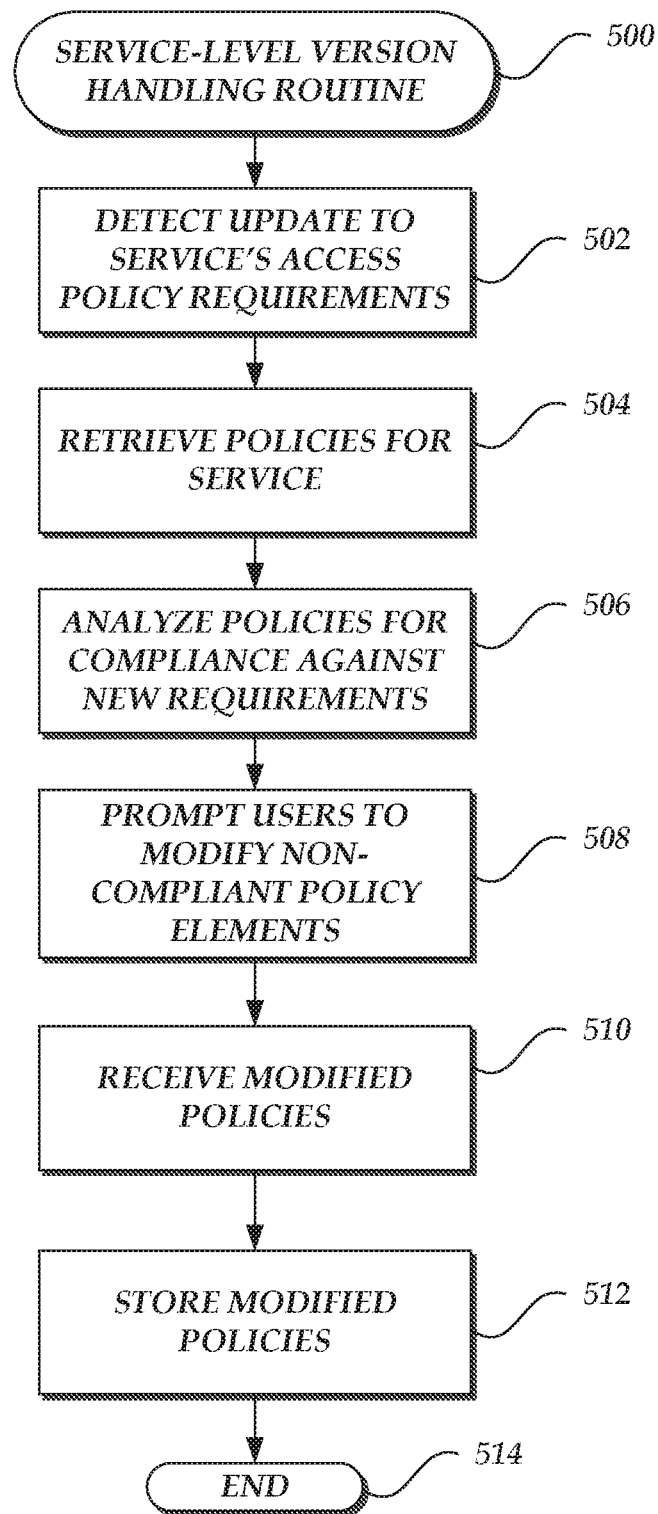
FIG. 5 is a flow chart depicting an illustrative routine for notifying service users that their respective access policies at an authorization service of FIG. 1 contain non-compliant or deprecated elements due to a modification of access policy guidelines at a service.

With reference to FIG. 5, an illustrative routine 500 for notifying service users of access policies including elements non-compliant with, deprecated under, or discouraged by a most recent set of access policy guidelines (which policies may for brevity be referred to herein as "non-compliant access policies") will be described. The routine 500 may be implemented, for example, by the authorization service 120 (e.g., via the authorization engine 126).

The routine 500 begins at block 502, where the authorization service 120 detects an update to access policy guidelines of a network service 110 associate with the authorization service 120. Such an update may correspond, for example, to a release by the network service 110 of a new version of access policy guidelines. Illustratively, a service 110 may notify the authorization service 120 of such an update, and provide to the authorization service 120 one or more rules for evaluating access policies for compliance with the access policy guidelines.

At block 504, the authorization service 120 retrieves access policies for the service 110. These policies may have previously been submitted by service users associated with instances 112 of the service 110, in order to authorize (or not authorize) accesses to the service instances 112. Thus, retrieval of access policies for the service 110 can include retrieval of the access policies from a data store associated with the authorization service 120 (e.g., the configuration data store 124).

At block 506, the authorization service 120 analyzes the access policies for compliance with the new access policy guidelines for the network service 110. Illustratively, the authorization service 120 may compare each criteria within each access policy, to determine whether the criteria complies with the new access policy guidelines (e.g. by specifying valid actions or functions at the service 110, by complying with guidelines for wildcard or pattern matching values, etc.). The authorization service 120 may further compare the format of each access policy to determine whether such a format complies with the access policy guidelines. Note that non-compliance with newly updated access policy guidelines may not in all cases implicate that an access policy is unenforceable. For example, the authorization service 120 may support multiple access policy requirement versions for a service 110, and an access policy may specify that it should be interpreted under a specific access policy requirement version. Thus, the access policy may be non-compliant with a newest access policy requirement version and the authorization service 120 may nevertheless enforce the access policy pursuant to a prior version of access policy guidelines for the service. In some embodiments, designation of a non-current version of access policy guidelines within an access policy may render the access policy non-compliant with a most current version of access policy guidelines. In other embodiments, the authorization service 120 may not identify an access policy as non-compliant solely based on designation within the access policy of a non-current version of access policy guidelines. In still other embodiments, the authorization service 120 may decline to evaluate access policies that specify a non-current version of access policy guidelines, so long as the designated a non-current version of access policy guidelines is within a threshold number of prior versions, or is expected to be supported by the authorization service 120 for a threshold period of time. For example, in one embodiment, the authorization service 120 may evaluate access policies for compliance with an updated set of access policy guidelines only if the access policy does not designate an access policy requirement version, or designates an access policy requirement version that is scheduled to lose support on the authorization service 120 within a threshold period of time. Illustratively, an administrator of the authorization service 120 may designate which access policies should be evaluated for compliance with updated access policy guidelines based on access policy requirement versions designated therein.

The routine 500 then proceeds to block 508, where the authorization service 120 prompts service users associated with respective access policies identified at block 506 to modify the non-compliant policies, such that the policies are compliant under the updated access policy guidelines. Illustratively, the authorization service 120 may transmit a notification to the service users (e.g., via an interface of the authorization service 120 or via other communication mechanism, such as electronic mail or messenger system). In some instances, the authorization service 120 may further notify a service user of individual elements of an access policy that is non-compliant with, deprecated by, or discouraged under updated access policy guidelines for a service 110. For example, the authorization service 120 may indicate that a "source identifier" criteria is specified with respect to a wildcard or pattern matching schema not supported under the updated access policy guidelines. In some instances, the authorization service 120 can further provide a suggested modification of one or more elements of the access policy, such that the element complies with updated access policy guidelines. For example, a network service 110, when updating access policy guidelines, may notify the authorization service 120 of a suggested transformation for an element from a form allowed under a prior set of access policy guidelines to a form allowed under a current set of access policy guidelines (e.g., transforming a first wildcard or pattern matching format to a second wildcard or pattern matching format, replacing a first function with a second function, etc.). Thus, the authorization service 120 may determine a transformation relevant to each non-compliant, deprecated, or discouraged element, and suggest to a service user that such transformation be made to render the access policy compliant with the updated access policy guidelines.

Thereafter, at block 510, the authorization service 120 can receive one or more modified policies from service users, if such service users elect to modify the respective policies in response to the notification from the authorization service 120. These modified policies may then be stored at the authorization service 120 and used to evaluate access requests of instances 112 of the service 110. Thus, by implementation of the routine 500, the authorization service 120 is enabled to notify service users of non-compliant access policies for network services 110 associated with the authorization service 120, reducing or eliminating errors at the authorization service 120 due to out of date access policies.

In some instances, it may be difficult in practice for a service user to author an access policy that results in the intended authorization result for requests to a service instance 112. For example, a service user may not fully understand the implications of various elements within a service policy, may specify wildcards with an incorrect syntax, or otherwise introduce errors into a service policy. Thus, it may be beneficial for an authorization service 120 to assist service users in generating, testing or evaluating access policies.

In one embodiment, the authorization service 120 may assist service users in generating an access policy by enabling the use of shadow policies, which can be evaluated with respect to requests received during a shadowing period specified by a service user without effecting authorization results returned during the shadowing period. Illustrative interactions for implementing such a shadow policy are depicted within FIG. 6.

Figure 6:
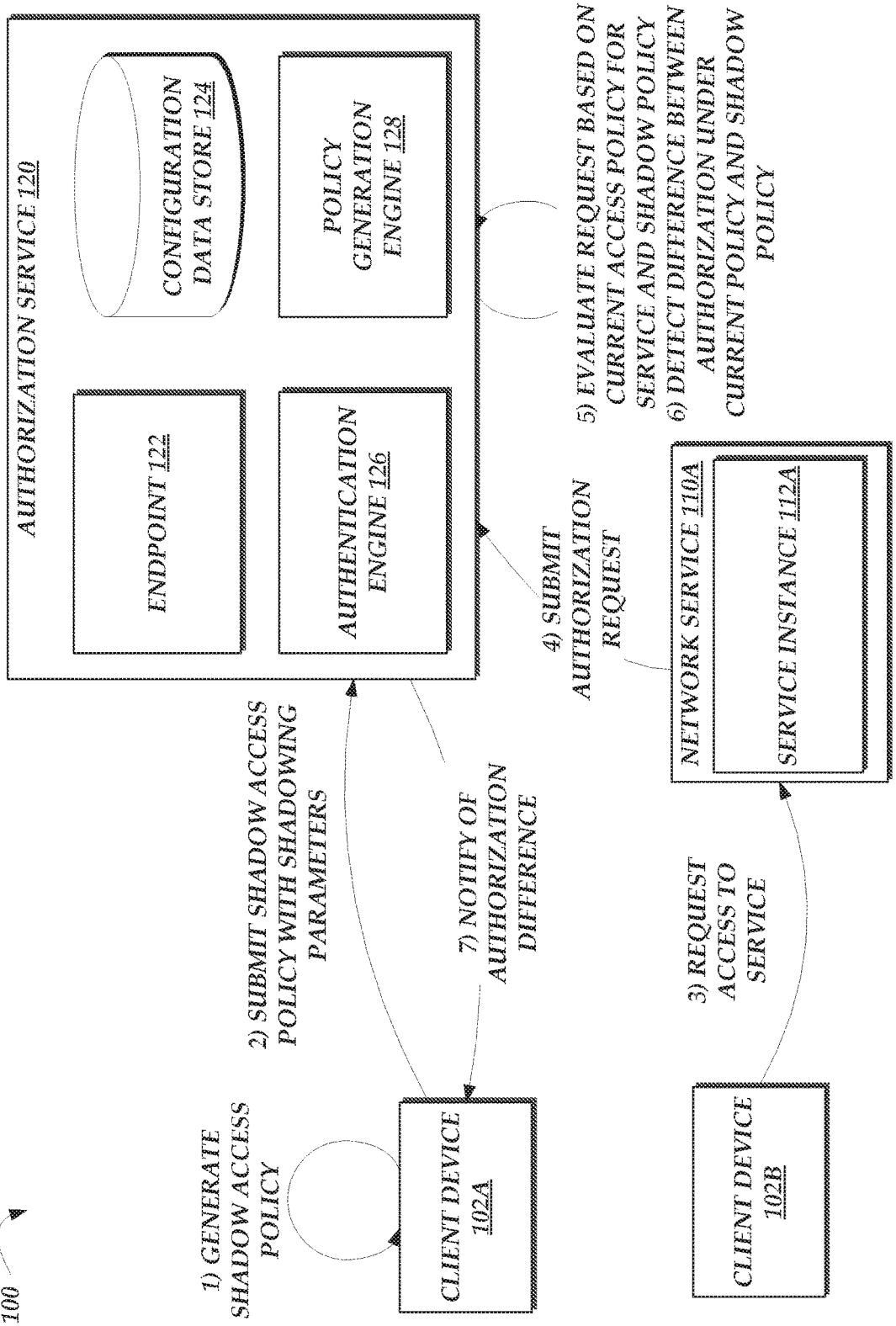
FIG. 6 is a block diagram depicting illustrative interactions to implement a shadow access policy at an authorization service of FIG. 1 with respect to a service instance, and to notify a service user of differences in authorization results under the shadow access policy and a currently in-force access policy for the service instance.

The interactions of FIG. 6 begin at (1), where a client device 102A operated by a service user generates a shadow policy for an instance 112A of a service 110A associated with the service user. The shadow policy can represent an access policy formatted in accordance with access policy guidelines of the service 110A; for example, a policy that the service user wishes to test before implementing. In some instances, the shadow policy may include one or more parameters indicating its status as a shadow policy. In other instances, the shadow policy may be substantially identical to a policy that could be put into force at the authorization service 120.

At (2), the client device 102A submits the shadow policy to the authorization service 120, in a manner similar to that described above (e.g., uploading of a text file, submission through an interface, etc.). In addition, the client device 102A can specify to the authorization service 120 shadowing parameters, designating how the shadow policy should be used by the authorization service 120. In one embodiment, the shadowing parameters can include a period of time during which requests to the service instance 112A should be evaluated against both the shadow policy and an in-force policy, in order to identify requests whose authorization result differs between the shadow policy and the in-force policy. The period of time may be specified, for example, in terms of a length of time (e.g., one hour, one day, etc.), in terms of starting and ending times (e.g., 1 pm to 3 pm), in terms of a number of requests (e.g., the next 100 requests), or by other criteria denoting when the authorization service 120 should assess requests to the service instance 112A according to the shadow policy.

Thereafter, during the shadowing period, the authorization service 120 may evaluate requests received at the service instance 112A according to against both the shadow policy and an in-force policy, in order to identify requests whose authorization result differs between the shadow policy and the in-force policy. In FIG. 6, this functionality is depicted with respect to a single request, though the authorization service 120 implement similar functionalities for any number of requests received during the shadowing period.

Specifically, at (3), a client device 102B (which may represent a device under the control of a user, a device under control of a service 110 or another service instance 112, etc.) transmits an access request to the service instance 112A. In a manner similar to that described above with respect to FIG. 3, the service instance 112A then, at (4), transmits information regarding the request to the authorization service 120, to determine an authorization result of the request under currently in-force access policies for the service instance 112A.

At (5), the authorization service 120 evaluates the request based on both currently in-force access policies for the service instance 112A (e.g., as previously established by a service user) and the shadow policy. Evaluation of a request can occur in a manner similar to that described above with respect to FIG. 3. In brief, the authorization service 120 can compare the request to criteria of each access policy, and when the request matches criteria of the access policy, determine an authorization result (e.g., allowing or denying access) in accordance with a result specified in the access policy. However, in contrast the interactions of FIG. 3, the authorization service 120 in FIG. 6 can compare the request both to currently in-force access polices to determine an authorization result under such in-force policies, and additionally compare the request to one or more shadow policies to determine an authorization result under such shadow policies.

With respect to FIG. 6, it will be assumed that the request of the client device 102B would be subject to a different authorization result under the shadow policies than the currently in-force policies. Thus, at (6), the authorization service 120 detects this difference in authorization result. Such a difference may occur due to intentional modification of access policies by a service user. For example, a service user may intend to broaden or restrict access under the shadow policies relative to a current policy. However, such a difference may also occur due to unintentional modification. For example, the currently in-force policy may be authored under a first set of access policy guidelines of the network service 110A (e.g., a first version), and the shadow policy may be authored under a second set of access policy guidelines of the network service 110A (e.g., a second version). The service user may have intended to draft the shadow policy to mirror authorization results of a currently in-force policy. However, changes in formatting or content between the first and second sets of access policy guidelines may have resulted in an error in the shadow policy (e.g., incorrect use of wildcard or pattern matching values).

Accordingly, at (7), the authorization service 120 transmits a notification to the client device 102A of the difference in authorization results under the currently in-force policy and the shadow policy. The notification may include, for example, information regarding a request that resulted in the authorization result (e.g., a function called, a source of the request, etc.). By notifying a service user of a request that received different authorization results under a currently in-force policy and a shadow policy, the user can be enabled to determine whether such differences are intentional or unintentional, and to correct errors in the shadow policy, if present. While a single difference in authorization result is depicted in FIG. 6, the authorization service 120 may in some instances notify a user of multiple differences in authorization results. For example, the authorization service 120 may record any difference occurring during the shadowing period, and at the end of the shadowing period, transmit to the user a log of all differences.

Figure 7:
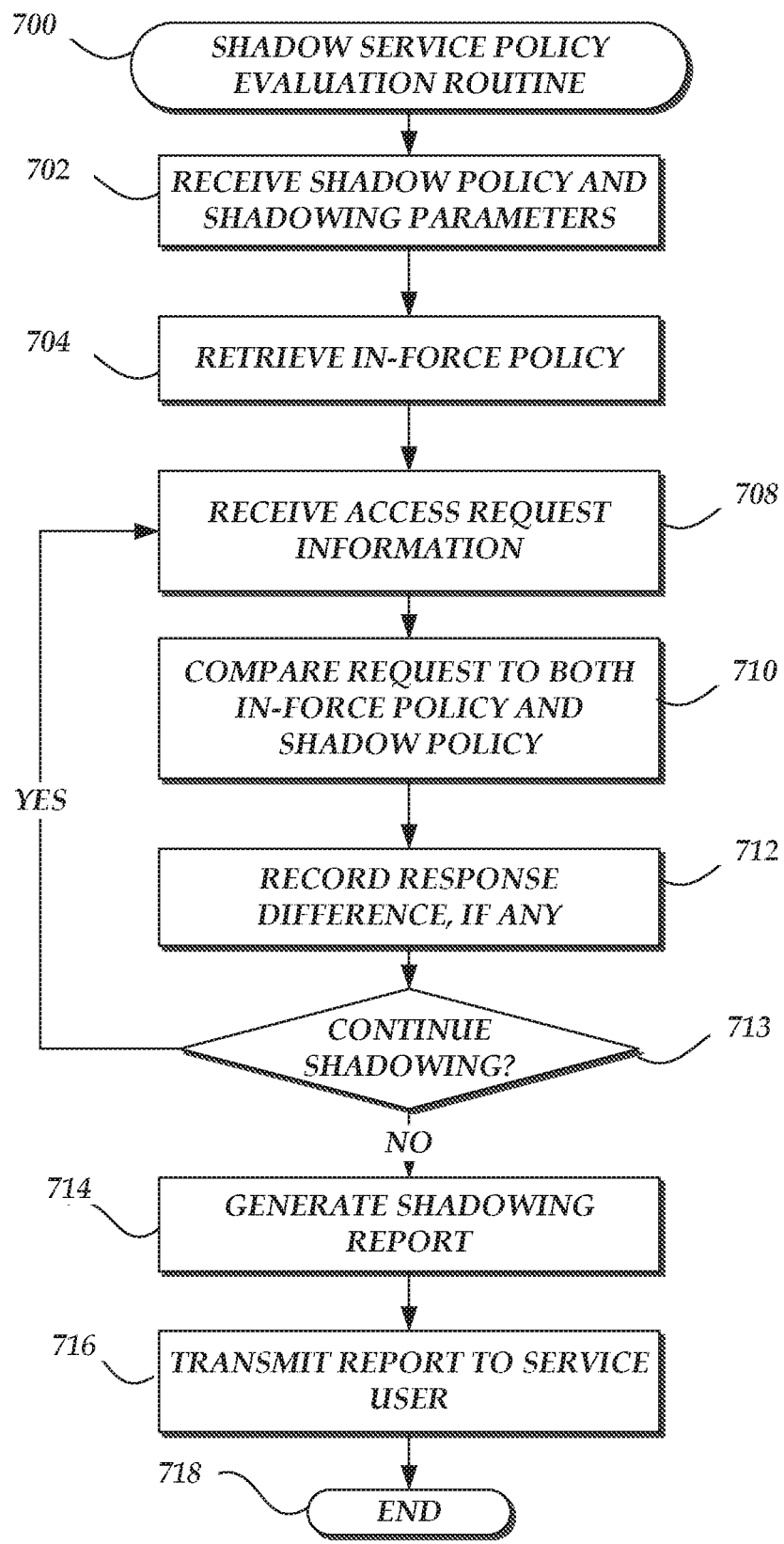
FIG. 7 is a flow chart depicting an illustrative routine for implementation of shadow policies at an authorization service of FIG. 1.

With reference to FIG. 7, an illustrative routine 700 for implementing shadow access policies, and notifying users of differences between authorization results under a shadow access policy and a currently in-force policy, will be described. The routine 700 may be implemented, for example, by the authorization service 120 (e.g., via the authorization engine 126).

The routine 700 begins at block 702, where the authorization service 120 receives from a service user a shadow policy and shadowing parameters related to an instance 112 of a network service 110. The shadow policy may include content similar or identical to an access policy, and may be submitted to the authorization service 120 in a manner similar or identical to other access policies (e.g., via upload of a text file, via a user interface, etc.). The shadowing parameters can generally define a period of time during which requests should be evaluated under the shadow policy, such as a time span (e.g., one hour, one day, etc.), an absolute time range (e.g., 1 pm to 2 pm), or a number of requests (e.g., the next 100 requests).

Thereafter, at block 704, the authorization service 120 retrieves one or more currently in-force access policies for the service instance 112 associated with the service user. In one embodiment, the retrieved in-force access policies may be specified within the shadow parameters. In another embodiment, the authorization service 120 retrieves all current in-force access policies for a service instance 112.

The routine 700 then continues to block 708, where the authorization service 120 receives information regarding a request to access the service instance 112 (e.g., from a client computing device 102). At block 710, the authorization service 120 evaluates the information according to both the currently in-force access policy and the shadow access policy, in order to determine an authorization result under each type of policy. For example, the authorization service 120 may determine that the request would be authorized under in-force policies, but not authorized under the shadow policy. Thereafter, at block 712, the authorization service 120 records a difference in the authorization result under the different policy types, if any. The authorization service 120 can further record the information of the request that prompted the difference in authorization result. The routine 700 then proceeds to block 713, where implementation of the routine 700 varies according to whether the authorization service 120 determines that shadowing should be conducted. Illustratively, block 713 may evaluate as true so long as the time period specified within the shadowing parameters has not yet elapsed. In the instance, that the time period has not elapsed, the routine 700 returns to block 708, and continues to loop through blocks 708 through 713 during the time period designated within the shadowing parameters.

When, at block 713, the authorization service 120 determines that shadowing should not be conducted (e.g., when the time period designated by the shadowing period elapses), the routine 700 proceeds to block 714, where the authorizations service 120 generates a shadowing report. The report can include, for example, information identifying each instance in which a different authorization result was provided between the currently in-force access policy and the shadow policy, as well as information regarding the request that prompted the difference in authorization result. For example, the shadowing report may be presented to the user as a log file of the requests that prompted differences in authorization results. In some instances, the shadowing report may indicate that no difference in authorization response was detected for any request received during the shadowing period. Such a "null result" may be helpful, for example, in indicating to a user that modifications made in a shadow access policy relative to an in-force access policy resulted in an intended lack of change in authorization responses between the two policies. Examples of modifications intended to not change authorization responses include, for example, modifications made purely to comply with updated access policy guidelines, or modifications made to update a style or format of a policy without effecting authorization response provided by the policy. Still further, the shadowing report may in some instances contain metric information for requests received during the shadowing period. Such metric information may include (by way of non-limiting example), a number of requests received during the shadowing period, a number or percentage of requests for which the same authorization response was provided by both an in-force access policy and a shadow policy, and a number or percentage of requests for which a different authorization response was provided between the in-force access policy and the shadow policy. At block 716, the shadowing report can be transmitted to a service user (e.g., via a user interface or other communication channel). The routine can then end at block 718.

While the routine 700 is described above as generating a single shadowing report transmitted to a service user, in some embodiments the routine 700 may be modified to provide "running" or "streaming" reports. For example, the authorization service 120 may generate incremental logs at each instance in which a difference in authorization result is detected, and notify the user of such difference (and information regarding a request that prompted such difference). Thus, the ordering of elements within routine 700 is intended to be illustrative in nature.

To further assist service users in authoring desired access policies for service instances, the authorization service 120 can in some embodiments further by configured to programmatically generate an access policy based on requests received at a service instance 112 during a training period. Illustrative interactions for such programmatic generation of an access policy are shown in FIG. 8.

Figure 8:
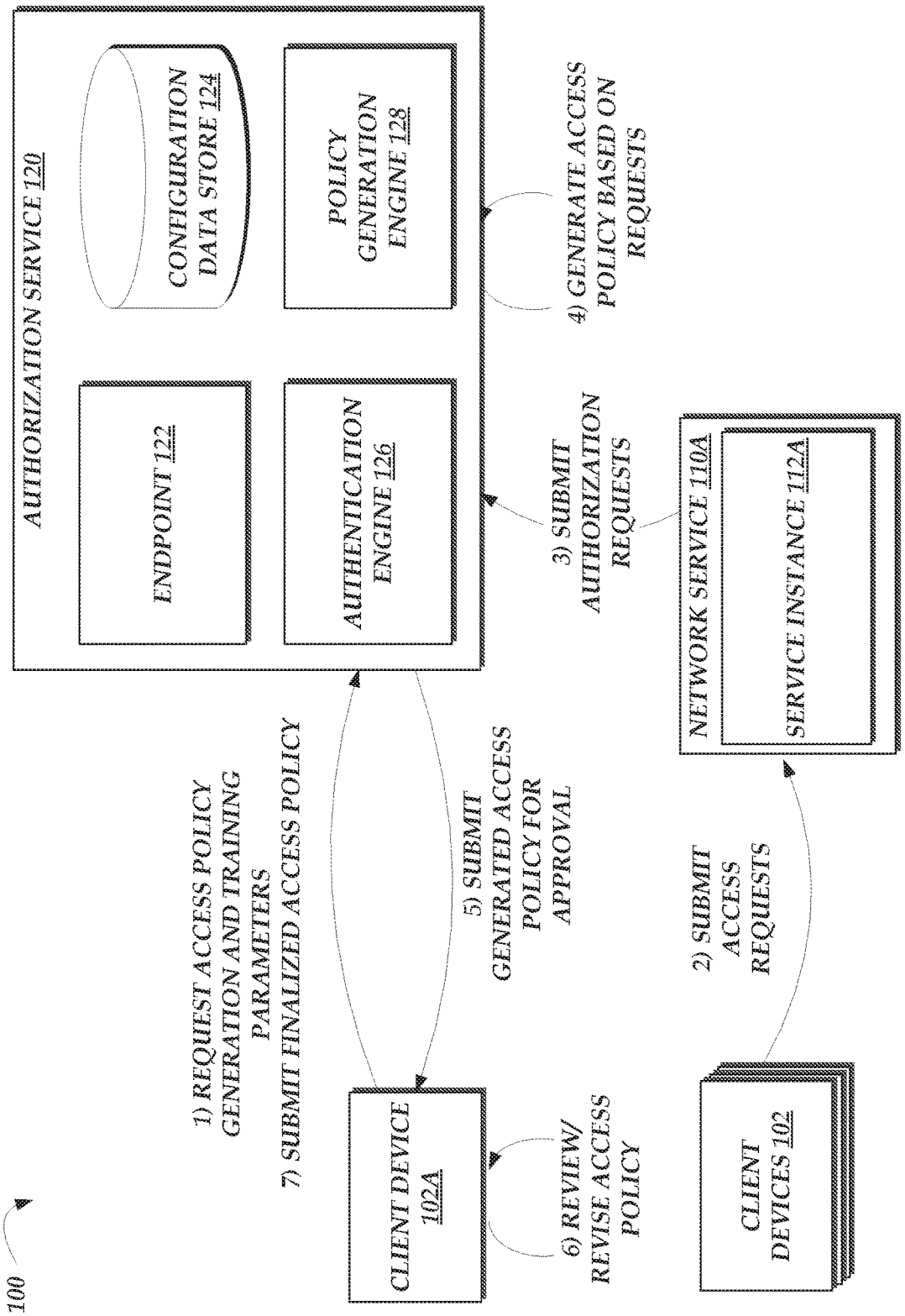
FIG. 8 is a block diagram depicting illustrative interactions to programmatically generate, at an authorization service of FIG. 1, an access policy for a service instance based on requests received during a training period.

Specifically, the interactions of FIG. 8 begin at (1), where a client device 102A under control of a service user transmits a request to the authorization service 120 to programmatically generate an access policy for a given service instance 112A (e.g., an instance 112 associated with the service user). The request may identify the service instance 112A, and further specify training parameters under which the access policy should be generated. The training parameters may include, for example, a time period during which request information received from the service instance 112A should be considered as part of training data, as well as a desired result for requests received during the time period. For example, training parameters may specify that an access policy should be generated such that application of the policy to the next n requests received at the service instance 112A would result in a specific authorization result (e.g., allowed, denied, etc.).

Thereafter, during the training period, one or more client devices 102 can submit access requests to the service instance 112A at (2). The service instance 112A, in turn, submits the authorization requests, at (3). While not shown in FIG. 8, the authorization service 120 may handle such authorization requests in a similar manner as is described above with respect to FIG. 3, such as by comparing the requests to currently in-force access policies and returning an authorization result as designated by such policies to the service instance 112A.

With respect to the interactions of FIG. 8, after receiving authorization requests during the training period (e.g., as specified within training parameters provided by the client device 102A), the authorization service 120 generates an access policy based on the requests. In general, the generated access policy can include parameters such that the requests received during the training period would, if later submitted to the service instance 112A, result in the authorization result designated by the client device 102A for the training period. In some instances, the generated access policy can include parameters such that requests similar to those received during the training period would result in the designated authorization result. Generally, the number or breadth of such similar requests encompassed within an authorization policy can correspond to a restrictiveness of the policy (where restrictiveness denotes a breadth or requests that conform to criteria of the policy, without necessarily implying a designated authorization result for the policy). A very restrictive policy, for example, may encompass only requests exactly matching parameter values of request received during the training period. Thus, the authorization service 120 may generate an access policy that results in the designated authorization result only for requests matching a combination of parameter values (e.g., a source, an authorization token, etc.) that also existed within requests received during the training period. The parameter types used in such a combination may be predetermined by the authorization service 120 or specified by a client device 102A. For example, a client device 102A may specify that only combinations of authentication tokens and called functions that are reflected in requests during the training period should result in a designated authorization result. Note that, in at least some instances, even a very restrictive access policy may encompass requests other than the literal requests transmitted during the training period, because those other requests may differ from the requests transmitted during the training period with respect to parameter types not specified within the access policy. For example, where a very restrictive access policy is generated based on combinations of authentication tokens and called functions within requests received during the training period, the policy may encompass later requests that have such a combination of authentication token and called function, but differ from the requests received during the training period with respect to other parameter types (e.g. source address). Thus, the authorization service 120 may generate a very restrictive access policy by including within the access policy each combination of parameter values (for relevant parameters, as predetermined by the authorization service 120 or specified by a client device 102A) observed within requests of the training period, such that subsequent requests having such a combination of parameter values is encompassed within the access policy.

A somewhat less restrictive access policy may encompass requests where each relevant parameter type (e.g., as predetermined by the authorization service 120 or specified by a client device 102A) has a value matching a value of a request as received during the training period, even where the request combines parameter values in a manner not occurring in a request of the training period. For example, such an access policy may encompass any request having a first authentication token value observed within requests of the training period and also calling a first function called during the training period, even if no individual request during the training period combined the first authentication token value and a call to the first function. Thus, the authorization service 120 may generate a less restrictive access policy by including within the access policy each parameter value (for relevant parameters, as predetermined by the authorization service 120 or specified by a client device 102A) observed within requests of the training period, such that subsequent requests matching the parameter values are encompassed within the access policy.

A still less restrictive access policy may utilize ranges, pattern matching values, or wildcard values to encompass requests with parameter values not observed within requests of the training period, but with values similar to values observed within requests of the training period. For example, with respect to a given parameter type (e.g., source address), an access policy may encompass parameter values within a range defined by requests received during the training period. Illustratively, where requests received during the training period fall within a range of network addresses (e.g., the range of internet protocol version 4 (IPv4) addresses between 192.0.2.1 through 192.0.2.254), an access policy may include criteria specifying that any source address within such a range is encompassed by the policy, regardless of whether the specific address was observed within a request of the training period. In some instances, parameter values for a given parameter type may be logically arranged within a hierarchy of nodes (e.g., a tree hierarchy comprising a root node, such as a "*" node, and branches to a number of child numbers, each of which may correspond to a different value, potential including wildcard or pattern matching values), and an access policy may be generated to include a range of parameter values defined by a most restrictive node within the hierarchy that would encompass parameter values observed within requests of the training period. For example, for a "location" parameter type, possible geographic locations can be arranged within a hierarchy (e.g., city, state, country, continent, etc.), and an access policy can be generated to encompass any location parameter values falling under a lowest node within the hierarchy that encompasses parameter values observed within requests of the training period. Illustratively, where all requests of the training period stem from a common city, an access policy can be generated to encompass requests stemming from the city. Where requests of the training period stem from different cities but a common state, an access policy can be generated to encompass requests stemming from the state, etc. The specific hierarchy of parameter values for a parameter type may be defined, for example, by the authorization service 120. Thus, an authorization service 120 may generate an access policy that, for each relevant parameter type (e.g., as defined by a client device 102 or the authorization service 120), encompasses a range of parameter values observed within requests of the training period.

In some instances, the authorization service 120 may apply different levels of restrictiveness to different parameter types specified as criteria within an access policy. For example, the authorization service may require that an "authentication token" parameter type match a value actually observed within a request of a training period, but may allow a "source address" value to fall within a range of source address values observed within requests of the training period. In some embodiments, the authorization service 120 enables a client device 102A to specify a restrictiveness to be applied to each parameter type when generating an access policy.

In some embodiments, the authorization service 120 may modify an initially generated access policy to ensure that the policy complies with access policy guidelines, or otherwise conforms to best practices for access policies. For example, in some instances, access policy guidelines may specify (e.g., as a best practice) that an access policy should be no more than a given length, or that no more than n potential values should be specified as criteria for a given parameter type (e.g., no more than 500 network addresses should be included within a list of potential network addresses that satisfy criteria for the policy). In such cases, the authorization service 120 may modify an non-compliant access policy to comply with the access policy guidelines. For example, the authorization service 120 may collapse criteria for one or more parameters by replacing a list of individual values with a wildcard or pattern matching value that encompasses all individual values within the list. Such a wildcard or pattern matching value may be determined, for example, in a manner similar to the determination of ranges or wildcard or pattern matching values discussed above (e.g., by selecting a range or lowest-level hierarchical node that encompasses all individual values that are to be replaced by the wildcard).

After generation of an access policy, as described above, the authorization service 120, at (5), submits the generated access policy to the client device 102A for approval. Illustratively, the authorization service 120 may visually present the generated access policy to a user through a graphical user interface (e.g., of a web browser application), or may transmit a file containing a representation of the access policy to the client device 102A. At (6), a service user at the client device 102A reviews the generated access policy, and makes revisions to the policy as desired by the service user. The client device 102A then returns the finalized access policy to the authorization service 120, which may apply the access policy to subsequent requests received at the service instance 112A. Thus, via the interactions of FIG. 8, the authorization service 120 is enabled to programmatically generate an access policy based on requests received during a training period, and a service user is enabled to create access policies for service instances 112 without being required to directly author such access policies.

While the interactions of FIG. 8 depict generation of a single access policy based on requests received during a single training period, in some embodiments the authorization service 120 can enable a service user to generate a single access policy based on requests received during multiple training periods (e.g., with the same or a different designated authorization result). Furthermore, in some embodiments the authorization service 120 can enable a service user to generate multiple access policies, each based on requests received during a respective training period, and further enable the service user to prioritize the access policies. Thus, the interactions of FIG. 8 are intended to be illustrative in nature.

Figure 9:
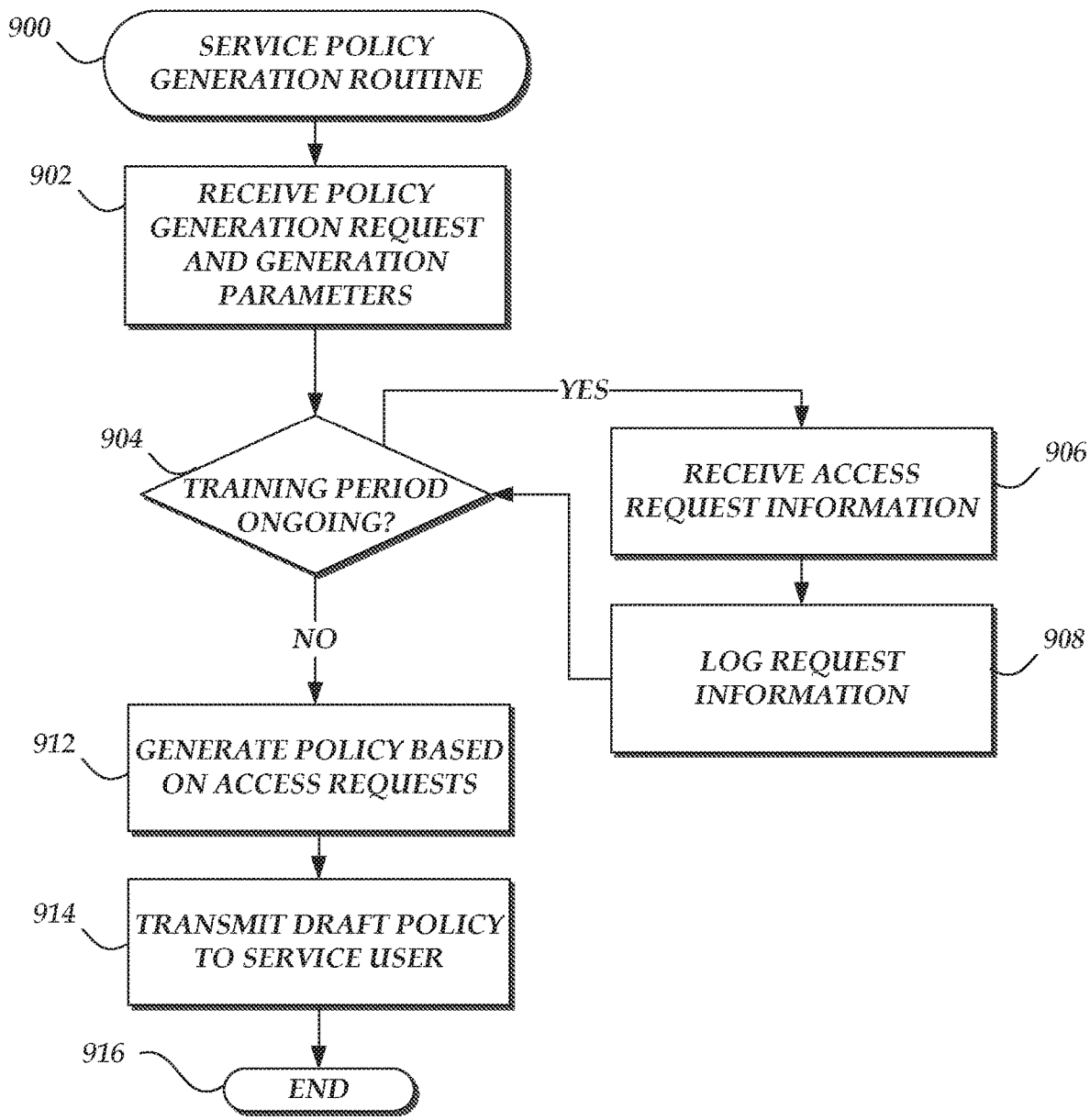
FIG. 9 is a flow chart depicting an illustrative routine for programmatically generating an access policy at an authorization service of FIG. 1 for a service instance based on requests received during a training period.

With reference to FIG. 9, an illustrative routine 900 for generating access policies based on requests received during a training period. The routine 900 may be implemented, for example, by the authorization service 120 (e.g., via the policy generation engine 128).

The routine 900 begins at block 902, where the authorization service 120 receives from a service user a request to generate an access policy for an instance 112 of a network service 110 based on requests received during a training period. The request may specify, for example, a duration of the training period, such as a time span (e.g., one hour, one day, etc.), an absolute time range (e.g., 1 pm to 2 pm), or a number of requests (e.g., the next 100 requests), as well as a desired authorization result for requests received during the training period (e.g., allowance or denial). Illustratively, during the training period, the service user may cause (e.g., via interaction with client devices 102) one or more example requests to be transmitted to the service instance 112, which example requests are illustrative of requests that should result in the desired authorization result.

The routine 900 then proceeds to block 906, where implementation of the routine 900 varies according to whether the authorization service 120 determines that the training period as designated in the received request is ongoing. Illustratively, block 904 may evaluate as true so long as the training time period specified within the received request has not yet elapsed. In this instance, the routine 900 continues to block 906, where the authorization service 120 receives information regarding a request to access the service instance 112 (e.g., from a client computing device 102). At block 908, the authorization service 120 stores the information regarding the request as part of a training data set, from which an access policy for the service instance 112 can later be generated. The routine 900 may then continue to loop through blocks 904 through 098 during the training time period designated within the request, gathering information on access requests received at the instance 112 and forming from the information a training data set.

When the training period expires, block 904 evaluates as false, and the routine 900 proceeds to block 912, where the authorization service 120 generates a policy based on the access requests received during the training period. The access policy may reflect the action specified within the request (e.g., as received at block 902), as well as criteria generated to reflect requests received during the training period. The criteria may correspond to one or more parameter types (e.g., authorization token value, source address, time, desired action, etc.), as designated in the generation request, predefined on the authorization service 120, etc. As noted above, the criteria may be generated according to a number of different levels of restrictiveness. In one embodiment, at least two of the criteria may be generated based on a "very restrictive" policy, such that the criteria encompass only requests matching a combination of parameter values observed in a request of the training set. In another embodiment, one or more criterion (e.g., corresponding to a specific parameter type) may be generated according to a "restrictive" policy, such that the criteria encompasses any value observed within a request of the training data set. Thus, where all criterion are generated according to the "restrictive" policy, requests may be encompasses within the generated access policy where each parameter value of the request matches a parameter value observed within a request of the training period, even if a specific combination of parameter values in the new requests do not match a combination present in the requests of the training data. In yet another embodiment, one or more criterion may be generated according to a "relaxed" or "permissive" policy, such that the criterion encompasses parameter values in a range or set determined based on parameter values of requests within the training data. For example, a criterion may encompass a range defined by the widest set of parameter values observed within requests of the training data (e.g., a minimum and maximum value). As another example, a criterion may encompass hierarchical values that fall under a lowest-level node of a hierarchy that also encompasses all values observed within requests of the training data set. Any combination of policy types can be used to generate an access policy. In one embodiment, a user may designate a policy type to be used for each criterion (e.g., corresponding to a parameter type). In another embodiment, the authorization service 120 may establish pre-determined policy types for each criterion. For example, the authorization service 120 may establish that a criterion corresponding to an authorization token parameter type is generated under a restrictive policy, while a criterion corresponding to source address or a time of day is generated according to permissive policy.

After generating the access policy according to the desired authorization result and the criteria determined based at least on part on the requests received during the training period, the authorization service 120 can submit the draft access policy to a service user (e.g., at a client device 102). Thereafter, the routine 900 ends at block 916. As noted above, a service user may, after receiving a draft access policy, a service user may review and revise the policy as needed to ensure correct authorization of requests at a service instance 112. The service user may then submit the revised policy to the authorization service 120 for implementation against the service instance 112.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more computing devices comprising a hardware processor and a memory and implementing a network-accessible service, the network-accessible service providing a plurality of instances of the network-accessible service, individual instances of the plurality of instances associated with individual service users of a plurality of service users;
   at least one physical data store including a plurality of access policies, individual access policies of the plurality of access polices corresponding to individual instances of the network-accessible service and designating authorization results for requests to access the individual instances that fall within criteria of the individual access policies; and
   one or more computing devices comprising a hardware processor and a memory and implementing an authorization service configured to utilize the plurality of access policies to control authorization to the plurality of instances, wherein the authorization service is further configured to:
   receive, from a service user of the plurality of service users, a request to programmatically generate an access policy for an instance of the network-accessible service associated with the service user, wherein the request specifies at least:
      a desired authorization result for the access policy;
      one or more parameter types to be reflected in criteria of the access policy; and
      a training period corresponding to a period of time during which requests to access the instance are to be captured for use in programmatically generating the access policy;
   generate a training data set comprising information regarding requests to access the instance received during the training period specified by the request to programmatically generate the access policy;
   determine criteria for the access policy based at least partly on the training data set, the criteria including at least one criterion specifying a value for the one or more parameter types, the value determined from information regarding requests within the training data set; and
   generate an access policy for the instance, the access policy identifying the desired authorization result and the criteria for the access policy determined based at least partly on the training data set; and
   store the access policy within the at least one physical data store for use in authorizing subsequent requests to access the instance.

2. The system of claim 1, wherein the one or more parameter types include at least one of a source identifier, a resource identifier, a source network address, a called function, one or more parameter values passed to a called function, a requested action, one or more parameter values for the requested action, an authentication token, or a timing of a request.

3. The system of claim 1, wherein the at least one criterion specifies at least one of one or more discrete values for the one or more parameter types, a pattern for the one or more parameter types, or a continuous range of values for the one or more parameter types.

4. The system of claim 3, wherein the authorization service is configured to determine the continuous range of values represented by the at least one criterion at least partly by identifying a range of values for the one or more parameter types present within requests of the training data set.

5. The system of claim 1, wherein individual instances of the plurality of instances correspond to service-user-specific resources spaces on the network-accessible service.

6. A computer-implemented method implemented by an authorization service configured to utilize access policies to control authorization to a network-accessible service, the computer-implemented method comprising:
   receiving, from a service user associated with an instance of the network-accessible service, a request to programmatically generate an access policy for the instance, wherein the request specifies at least:
      a desired authorization result for the access policy; and
      a training period corresponding to a period of time during which requests to access the instance are to be captured for use in programmatically generating the access policy;
   generating a training data set comprising information regarding requests to access the instance received during the training period specified by the request to programmatically generate the access policy;

determining criteria for the access policy based at least partly on the training data set, the criteria including at least one criterion for identifying requests to access the service encompassed by the policy, the criterion determined from information regarding requests within the training data set; and generating an access policy for the instance, the access policy identifying the desired authorization result and the criteria for the access policy determined based at least partly on the training data set; and storing the access policy within the at least one physical data store for use in authorizing subsequent requests to access the instance.

7. The computer-implemented method of claim 6, further comprising:
transmitting the access policy to a client device of the service user;
receiving modifications to the access policy; and
apply the modifications to the access policy.

8. The computer-implemented method of claim 6, further comprising:
receiving from the instance information regarding a request to access the instance;
evaluating the information according to the access policy to determine an authorization result; and
returning the authorization result to the instance, the authorization result indicating at least one of a grant or denial of the request to access the instance.

9. The computer-implemented method of claim 6, wherein the request specifies at least one parameter type for which the at least one criterion specifies a value.

10. The computer-implemented method of claim 6, wherein at least one parameter type for which the at least one criterion specifies a value is predetermined at the authorization service.

11. The computer-implemented method of claim 6, wherein potential values of one or more parameter types for which values are specified in the criteria of the access policy are arranged within a value hierarchy, wherein multiple values for the one or more parameter types are present within requests of the training data set, and wherein determining criteria for the access policy includes determining a lowest-level node within the hierarchy that is a parent to nodes representing each of the values for the one or more parameter types present within requests of the training data set.

12. The computer-implemented method of claim 6, wherein determining criteria for the access policy includes determining a set of values for one or more parameter types for which values are specified in the criteria of the access policy, that are present within requests of the training data set.

13. The computer-implemented method of claim 6, wherein determining criteria for the access policy includes determining combinations of values, for at least two parameter types for which values are specified in the criteria of the access policy, that are present within requests of the training data set.

14. Non-transitory computer-readable media comprising instructions that, when executed by an authorization computing system, cause the authorization computing system to:
receive, from a service user associated with a network-accessible service, a request to programmatically generate an access policy for the network-accessible service, wherein the request specifies at least:
a desired authorization result for the access policy; and
a training period corresponding to a period of time during which requests to access the network-accessible service are to be captured for use in programmatically generating the access policy;
generate a training data set comprising information regarding requests to access the network-accessible service received during the training period specified by the request to programmatically generate the access policy;
determine criteria for the access policy based at least partly on the training data set, the criteria including at least one criterion for identifying requests to access the network-accessible service encompassed by the policy, the criterion determined from information regarding requests within the training data set; and
generate an access policy for the network-accessible service, the access policy identifying the desired authorization result and the criteria for the access policy determined based at least partly on the training data set; and
store the access policy within the at least one physical data store for use in authorizing subsequent requests to access the network-accessible service.

15. The non-transitory computer-readable media of claim 14, wherein the access policy applies to an instance of the network-accessible service provided on behalf of a service user.

16. The non-transitory computer-readable media of claim 14, wherein the instructions further cause the authorization computing system to determine the at least one criterion from the information regarding requests within the training data set according to a restrictiveness level, the restrictiveness level corresponding to an algorithm for determining the at least one criterion from parameter values present within the requests of the training data set, and wherein the restrictiveness level for the at least one criterion is specified within the request to programmatically generate the access policy.

17. The non-transitory computer-readable media of claim 14, wherein the instructions further cause the authorization computing system to determine the at least one criterion from the information regarding requests within the training data set according to a restrictiveness level, the restrictiveness level corresponding to an algorithm for determining the at least one criterion from parameter values present within the requests of the training data set, and wherein the restrictiveness level for the at least one criterion is predetermined at the authorization computing system.

18. The non-transitory computer-readable media of claim 14, wherein the instructions further cause the authorization computing system to:
receive from the instance information regarding a request to access the network-accessible service;
evaluate the information according to the access policy to determine an authorization result; and
return the authorization result to the network-accessible service, the authorization result indicating at least one of a grant or denial of the request to access the network-accessible service.

19. The non-transitory computer-readable media of claim 14,
wherein potential values of one or more parameter types for which values are specified in the criteria of the access policy are arranged within a value hierarchy, wherein multiple values for the one or more parameter types are present within requests of the training data set, and wherein the instructions cause the authorization computing system to determine criteria for the access policy at least partly by determining a lowest-level node within the hierarchy that is a parent to nodes representing each of the values for the one or more parameter types present within requests of the training data set.

20. The non-transitory computer-readable media of claim 14, wherein the instructions cause the authorization computing system to determine criteria for the access policy at least partly by determining, for one or more parameter types for which values are specified in the criteria of the access policy, that are present within requests of the training data set.

21. The non-transitory computer-readable media of claim 14, wherein the instructions cause the authorization computing system to determine criteria for the access policy at least partly by determining combinations of values, for at least two parameter types for which values are specified in the criteria of the access policy, that are present within requests of the training data set.

* * * * *